March 20, 1956 — C. H. REX — 2,739,226
LUMINAIRE
Filed June 3, 1949 — 7 Sheets-Sheet 1

Inventor:
Charles H. Rex,
by (signature)
His Attorney.

Inventor:
Charles H. Rex,
by
His Attorney.

Inventor:
Charles H. Rex,
by *Claude H. Mott*
His Attorney.

March 20, 1956   C. H. REX   2,739,226
LUMINAIRE

Filed June 3, 1949   7 Sheets-Sheet 6

Inventor:
Charles H. Rex,
by Claude A. Mott
His Attorney.

United States Patent Office 2,739,226
Patented Mar. 20, 1956

2,739,226

LUMINAIRE

Charles H. Rex, Marblehead, Mass., assignor to General Electric Company, a corporation of New York Application June 3, 1949, Serial No. 96,972

10 Claims. (Cl. 240—25)

My invention relates to luminaires, and more particularly to street or roadway luminaires of the enclosed type including an upper bowl-shaped reflector and a lower bowl-shaped refractor closing the mouth of the reflector.

Heretofore, it has been known to design luminaires for disposition at one side of a roadway. In such luminaires, it is necessary to provide a roadway lighting pattern which is asymmetric with respect to a line parallel to the road and passing through the nadir. To provide such an asymmetric pattern from a luminaire of circular horizontal cross section is difficult and subject to improvement because the asymmetric characteristic must be added either entirely by refraction or by secondary reflection or both. Moreover, secondary reflection, with its incident losses in efficiency, is usually necessary because, by its very nature, a circular reflector alone, mounted at the roadside, directs one-half of the light flux away from the roadway.

To overcome the foregoing difficulties of providing an asymmetric pattern from a side-mounted circular luminaire, it has heretofore been proposed to provide a side-mounted luminaire having an ovate horizontal configuration. By disposing such an ovate luminaire at one side of the road with its larger end facing the road, the converging side portions of the reflector direct a large portion of the available light flux into a pair of main oblique light beams directed toward and along the roadway in opposite directions. Such a luminaire and reflection is described and claimed in my Patent 2,578,451 granted December 1, 1951, on my co-pending application, Serial Number 694,012, filed August 30, 1946, for Luminaire, and assigned to the same assignee as the instant application.

In accordance with my present invention, the asymmetric characteristic of an ovate reflector is utilized more efficiently and a more effective concentration of light along the main oblique roadway beams is made possible by providing in combination with such a reflector a prismatic refracting globe having a portion arranged to raise the main beams. The ovate reflector of my present invention makes it possible to direct at least three quarters of the available light flux toward the roadway pattern, and to use the greater part of this flux to establish by single reflection only a pair of main oblique beams. By combining with such reflector a refractor in accordance with my invention, it is further possible to increase the vertical angle of spread of these main beams and also to direct into or toward the main beams a large proportion of the remaining available direct and reflected light. More over, by utilizing the refractor to lift and increase the vertical angle of spread of the main beams as they leave the luminaire, it is possible to initially establish these beams at the reflector with only relatively small vertical angle of spread. At this small vertical angle of spread, the main beams within the luminaire may be directed downwardly across the mouth of the reflector and below the rim at the other side in concentrated ray form without double reflection. By thus establishing the main beams at a low vertical angle and raising them by refraction, a wide vertical angle of light flux may be directed into the main beams, and the depth of the main beam as it leaves the globe may be increased. This results in a large main beam source area on the globe.

Accordingly, therefore, it is a general object of my invention to provide a new and improved street or roadway lighting luminaire.

It is a further object of my invention to provide a new and improved street or roadway luminaire arranged to direct light by single reflection and with a maximum efficiency into a pair of main oblique beams directed toward and along the roadway in opposite directions.

It is still another object of my invention to provide new and novel means for improving the beam concentration in an oblique beam type ovate roadway luminaire.

A still further object of my invention is to provide, in a street or roadway luminaire, a new and novel combination of an ovate oblique beam type reflector and refracting means cooperable with the reflector to utilize much of the available light flux normally dispersed by such reflectors to build up and intensify the main oblique beams.

It is still a further object of my invention to provide a new and novel ovate reflector for a roadway luminaire arranged to establish a pair of main oblique beams from discrete but mutually contributory side sections.

Another object of my invention is to provide an ovate oblique beam type luminaire particularly adapted for operation in conjunction with an elongated horizontal light source.

It is a still further object of my invention to provide a new and novel oblique beam type ovate luminaire which provides a high degree of efficiency of light utilization when used either with an elongated horizontal light source or with a relatively punctiform filament light source.

For a better understanding of my invention and a further appreciation of its various objects and advantages, reference may now be had to the following detailed specification taken in conjunction with the accompanying drawings, in which.

Figure 1:
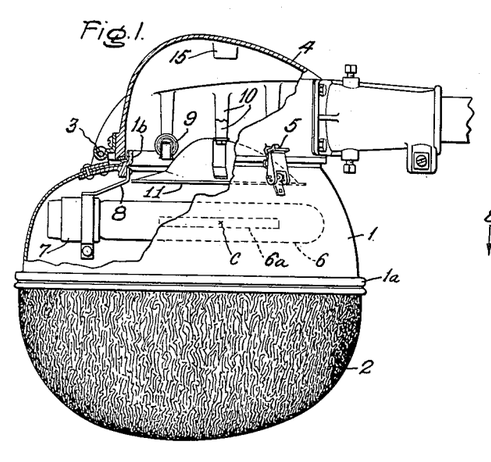
Figs. 1, 2 and 3 are side, front and top views, respectively, of a luminaire embodying my invention and utilizing an elongated horizontal light source, Fig. 1 being shown partly in section.
Figure 2:
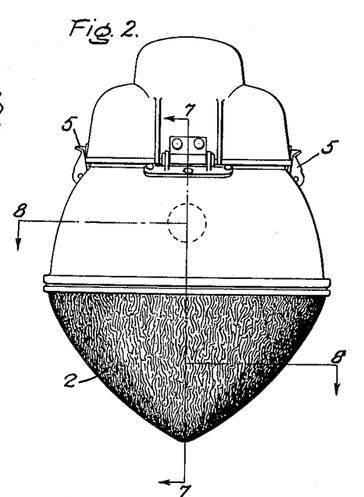
Figure 3:
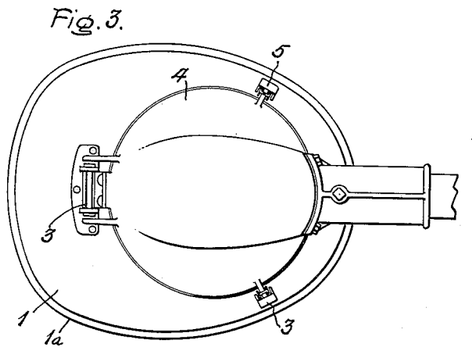

Referring now to the drawings, and particularly to Figs. 1, 2 and 3, the luminaire there shown comprises a main bowl-shaped reflector 1 of generally ovate horizontal configuration having a down-turned open mouth defined by a reflector rim 1a, and a bowl-shaped prismatic globe or refractor 2 disposed below and closing the mouth of the reflector. The rim 1a of the reflector 1 is spun over the rim of the refractor, thereby to provide a permanent and substantially dust-proof connection therebetween. The reflector 1 is provided with a large circular upper opening defined by a reinforcing collar 1b which fits into a mounting hood 4. The reflector 1 is pivotally connected to the hood 4 by a hinge and pin 3 and is held in normal operating position on the mounting hood by a pair of latches 5 disposed at opposite sides toward the rear of the mounting collar. When the latches 5 are released, the reflector 1 and attached globe 2 may be swung outwardly and downwardly on the pivot pin 3 to permit access to the lamp.

The luminaire illustrated at Figs. 1, 2 and 3 includes an elongated horizontally disposed light source, such as a mercury vapor discharge lamp 6 having an inner discharge envelope 6a and mounted in a socket 7. The socket 7 is positioned in the forward end of the reflector where it will least interfere with reflection of light toward the roadway and is mounted upon a depending bracket 8 connected to the mounting collar 1b. To provide access to the reflector for cleaning, the bracket 8 may suitably be made detachable from the collar 1b. Within the mounting hood 4, various mounting bosses are provided for supporting a pair of electromagnets 9 (only one of which is shown) in position above the lamp electrodes (not shown) at the ends of the envelope 6a. The electromagnets 9 operate to control the arc in the discharge lamp 6 in the manner described and claimed in U. S. Letters Patent 2,042,140, issued to A. Bünger on May 26, 1936.

Figure 5:
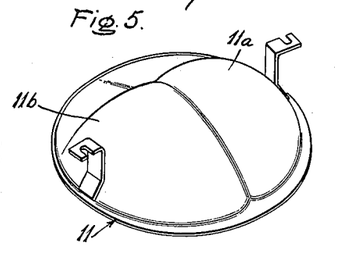
Fig. 5 is a perspective view of the upper auxiliary reflector shown at Fig. 1 for an elongated horizontal light source.

The mounting hood 4 is also provided internally with a pair of mounting bosses 10 arranged to support over the lamp 6 and within the upper opening of the main reflector 1 an auxiliary upper reflector 11 shown in perspective at Fig. 5.

Figure 4:
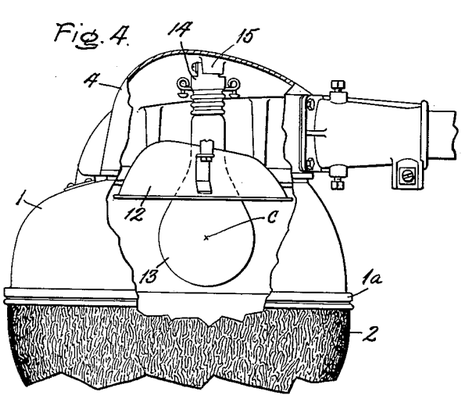
Fig. 4 is a side view partly in section of a similar luminaire embodying my invention and utilizing a filament light source.
Figure 6:
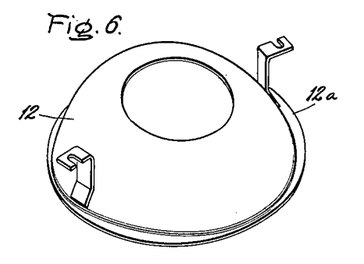
Fig. 6 is a perspective view of an auxiliary upper reflector of the type shown at Fig. 4 for an incandescent source.

The upper auxiliary reflector 11 is removably mounted, so that there may be alternatively mounted upon the brackets 10 another form of auxiliary reflector, such as the reflector 12 shown in perspective at Fig. 6 and illustrated in position at Fig. 4. The reflector 12 is generally in the form of an inverted bowl of ovate horizontal contour provided with an upper aperture to facilitate mounting of a filament lamp 13 instead of the elongated discharge lamp 6 shown at Fig. 1. As illustrated at Fig. 4, the filament lamp 13 is mounted in a socket 14 fixed to the upper side of the mounting hood 4 by means of suitable mounting bosses 15. In other respects, the luminaire illustrated at Fig. 4 is similar to that illustrated at Fig. 1.

It will be noted that in both illustrated embodiments of my invention, namely that of Fig. 1 utilizing an elongated arc discharge lamp and that of Fig. 4 utilizing a filament lamp, the center of the light source is well above the rim 1a of the reflector 1 and is eccentrically positioned toward the rear of the major horizontal axis of the reflector. The effective center of the light source is indicated by the point c for both the discharge lamp 6 and the filament lamp 13. The location of the light source center c above the rim of the reflector provides a low angle of cutoff of direct illumination along and across the roadway, thereby effectively to shield a driver's eyes from direct exposure to light from the source. This shielding of source is shown by the 65° dotted line of Fig. 9. The vertical angle of light source cutoff is lower than the vertical angle of maximum candle power concentration from the reflector and prismatic globe.

The discharge lamp 6 includes an inner discharge envelope 6a containing at its ends the discharge electrodes. The length of the arc between these electrodes is indicated approximately at Fig. 1 and is only slightly greater than the distance between the control magnets 9. In determining the desired reflector contour for an elongated source, such as that shown at Fig. 1, the effective light center, or equivalent point source, may be approximated by considering it as at the geometric center of the arc. Thus, the reflector design is based upon an effective light center at the point c, and is the same for either an elongated arc source or a filament source.

Figure 7:
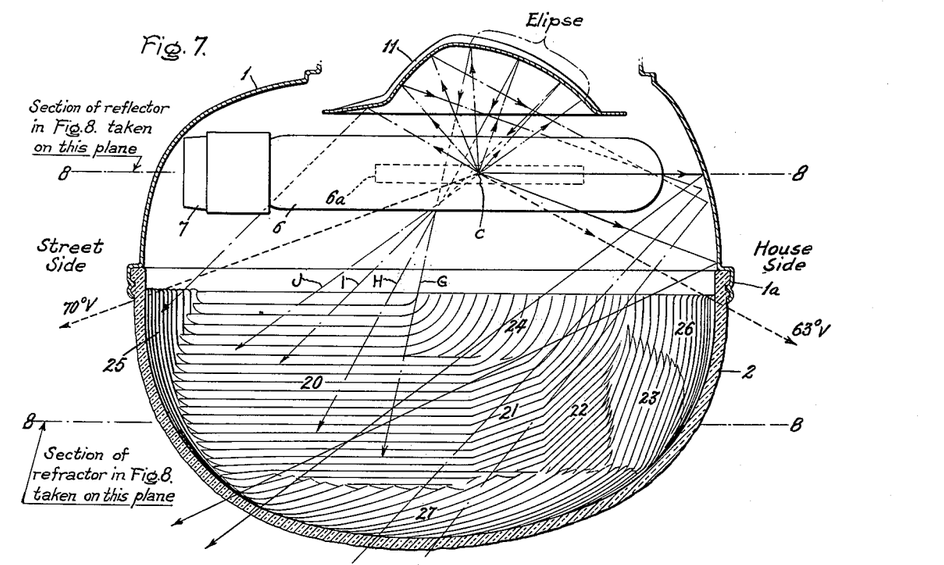
Fig. 7 is a side elevational section of the luminaire shown at Fig. 1 taken along the line 7—7 of Fig. 2 and illustrating the prismatic formation of the globe and the vertical contour in the plane of symmetry of the upper reflector for an elongated light source.
Figure 8:
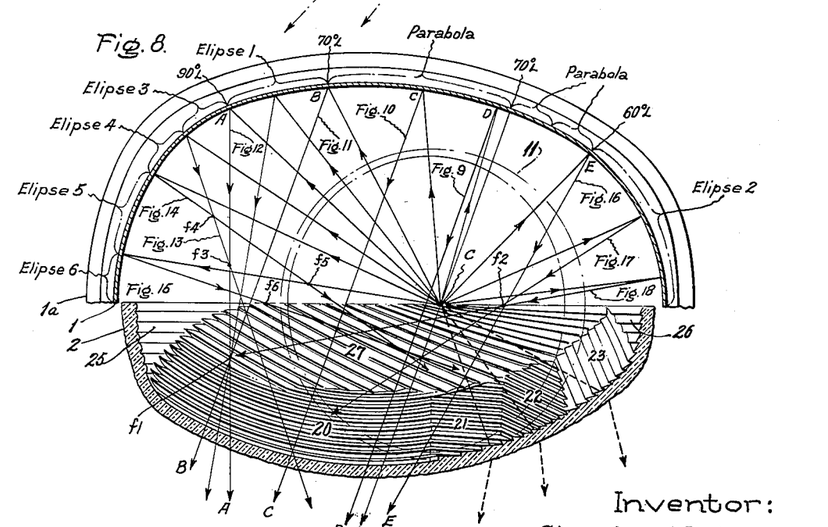
Fig. 8 is a horizontal cross-sectional view of the luminaire shown at Figs. 1, 2 and 3 and taken in the planes 8—8 of Fig. 2.

The details of the configuration of my luminaire including the main reflector 1, the refractor 2 and the auxiliary reflector 11 will be readily understood by referring now to Figs. 7 to 18, inclusive. The entire luminaire is symmetrical about a major vertical plane through which the cross-sectional view of Fig. 7 is taken, as indicated by the line 7—7 of Fig. 2. The lines of intersection of this plane of symmetry with planes parallel to the plane of the reflector rim define major axes about which the various horizontal sections are symmetrical. For example, the reflector section of the upper half of Fig. 8 is taken in a plane through the light source and parallel to the reflector rim as indicated by 8—8 in Figs. 2 and 7. This reflector section is symmetrical about the major or longitudinal axis through the center of the light source. Similarly, the refractor section shown at the lower half of Fig. 8 is taken in a plane parallel to the reflector rim and at about the mid-point of the depth of the refractor 2, as indicated by section line 8 in Figs. 2 and 7. This refractor section is also symmetrical about its major axis. Neither the reflector 1 nor the refractor 2 are symmetrical about the minor or transverse axis through the center of the light source.

For the purpose of simplifying the following description, it will be understood that the reflector rim is disposed in a substantially horizontal plane parallel to the plane of the roadway, as the luminaire is normally mounted. It will also be understood, of course, that if desired, the luminaire may be mounted with the plane of the reflector rim slightly oblique to the roadway. Thus, in this specification and in the appended claims, where the words "horizontal" and "vertical" are used in defining planes through the reflector 1 and refractor 2, these terms are to be understood to define only parallelism and perpendicularity, respectively, with the plane of the reflector rim.

In general, the main reflector 1 comprises like side portions on opposite sides of the plane of symmetry arranged to direct reflected light mainly obliquely along the roadway, and a pair of end portions at opposite ends of the major axis of the reflector arranged generally to direct light downwardly and obliquely across the roadway. Each side portion of the reflector directs a concentrated beam distribution of light downwardly and outwardly along the roadway in one direction, the beams from opposite side portions being directed along the roadway in opposite directions.

The side portions of the reflector are so shaped that they direct into each such main oblique beam approximately a full quadrant of light flux from the source, the light rays within each beam being generally parallel and each beam intersecting the roadway in a confined pattern covering a small angle of approximately 30° on the roadway. Thus, the reflector operates to concentrate a large amount of the available amount of light flux into the principal oblique beams. These main oblique beams cross the reflector at a relatively low vertical angle of approximately 53° to 57° with the vertical to the nadir and intercept the refractor on the opposite side below the rim of the reflector. The refractor portions intercepted by the main beams are provided with horizontal prisms which operate only to raise the main beams to higher vertical angles, thereby to increase their vertical angle of spread and elongate the roadway pattern.

The rear end portion of the reflector is so shaped that all the reflected light emanating therefrom intercepts the refractor forward of the minor axis, so that much of this reflected light from the rear end portion of the reflector is used to build up and intensify the main oblique beams. The refractor is provided behind the minor axis with an area of oblique prisms, which receive light directly from the source and light reflected from the front end of the reflector. Both the direct and reflected light falling upon these oblique prisms is at about the same vertical angle, and this light is simultaneously raised and turned forward toward the main oblique beams to further concentrate light on the roadway in an asymmetric pattern.

The front end portion of the refractor is provided with an area of vertically disposed spreading prisms which receive direct light from the source and some reflected light from the rear end of the reflector and laterally distribute the light on the roadway.

As the description proceeds, it should be particularly noted that the lifting prisms which operate only to raise the main oblique beams permit the principal side portions of the reflector to form the beams and redirect them across the reflector at relatively low vertical angles. At such low angles, the vertical configuration of the reflector may be generally parabolic for substantially its full height. With a parabolic vertical configuration, the beam formed is composed of light rays which are parallel in a vertical plane. At the low vertical angle of 53° to 57°, a wide beam of vertically parallel rays may be directed across the reflector and below the light source and the reflector rim on the opposite side without secondary reflection. This wide beam of parallel rays is then lifted by the lifting prisms without destroying its parallelism and emanates from the refractor at a vertical angle of approximately 72° or 73°, retaining the concentrated characteristic of a parallel beam.

From the foregoing, it will now be evident that in a luminaire embodying my invention the principal lateral distribution, and particularly the main beam distribution, is effected by the reflector system, while the refractor acts only to raise the main beams and also to supplement to some degree the lateral distribution of light falling upon the rear quadrants and the bottom of the refractor.

The purpose and operation of the auxiliary upper reflector 11 will be more fully described hereinafter.

Figure 12:
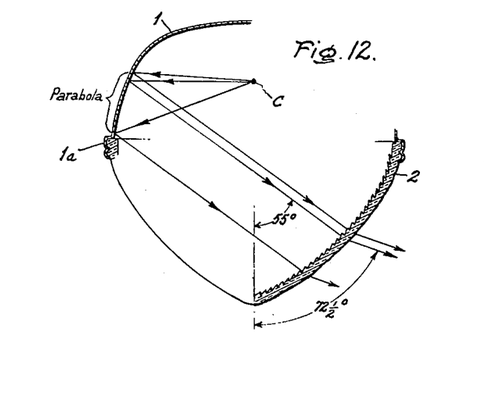

Referring now more specifically to Fig. 8, the various directional lines there shown, such as AA to EE and those unmarked, represent the projection, on a horizontal plane, of direct and reflected light rays taken at various points around the reflector in that plane. The main side portion of that half of the reflector 1 shown at Fig. 8 in cross section is that portion included between the region of a vertical section AA (see Fig. 12) and the region of a vertical section EE (see Fig. 16). The horizontal cross-sectional configuration of this side portion of the reflector is a composite curve comprising a central parabolic region between the sections BB and DD, a rear parabolic region between the sections DD and EE, and a front elliptical region between the sections AA and BB. The two parabolic regions have common foci at the center c of the light source and their axes slightly converging in horizontal projection. The central parabolic region from B to D has its axis parallel to the line BB in horizontal projection, at an angle of about 70° with the major axis. This central region of the side portion thus formulates a beam of light composed of rays which are parallel in horizontal projection, and directs this beam downwardly and obliquely across the bottom of the reflector at a horizontal angle of 70° with the major axis and a vertical angle of about 56° with the vertical to the nadir. The rear parabolic region of the reflector side portion, that is, the region between D and E, comprises a plurality of adjacent parabolic regions whose axes converge slightly from a horizontal angle of 70° at the section DD to a horizontal angle of 60° at the section EE. The forward elliptical region of the reflector side portion, that is, the region between A and B, has one focus at the center c of the light source and its conjugate focus at a point $f_1$ within the reflector and on the opposite side of the plane of symmetry below the plane of the reflector rim. As will be evident from Fig. 8, this elliptical region of the reflector directs diverging light into the main asymmetric oblique beam.

Behind the section EE, the rear end portion of the reflector 1 is elliptical in horizontal section, having one focus at the center c of the light source and the other focus at a point $f_2$ approximately in the plane of symmetry. All the reflected light from this rear elliptical portion of the reflector 1 intercepts the refractor 2 on the front side of the minor axis. Most of the reflected light from the rear end portion of the reflector is directed generally across the roadway.

The front end portion of the reflector in horizontal cross section, between the section AA and the plane of symmetry, comprises a plurality of adjacent elliptical regions, as indicated at Fig. 8. These elliptical regions have a common focus at the center c of the light source and have their conjugate foci at the points $f_3$, $f_4$, $f_5$ and $f_6$, respectively, progressing from the section AA to the major axis in a clockwise direction, as indicated at Fig. 8. A major portion of the reflected light from this front end elliptical portion of the reflector is directed toward the rear of the luminaire and into the rear quadrants of the refractor on the opposite side of the plane of symmetry. It is these rear quadrants of the refractor which are provided with the areas of oblique or diagonal prisms, to be more fully described hereinafter. In general, it is sufficient to note that the reflected light from the front elliptical portion of the reflector on each side of the major axis intercepts the rear quadrant of the refractor on the opposite side of the major axis, and is both raised and turned forward simultaneously by the diagonal prisms. Thus, the light from the front end of the reflector is turned toward the roadway and is used to build up the light pattern on the house side of the luminaire.

It will be evident from the foregoing that the various lines of reflected light shown at Fig. 8, that is, the lines AA to EE, inclusive, and the various lines passing through the foci $f_1$ to $f_6$, inclusive, represent the horizontal projections on a plane through the light source of light rays reflected from various points around the reflector in that plane. It is well known to those skilled in the art that those light rays impinging upon a parabolic reflector from the focus of the parabola are redirected parallel to the parabolic axis, while any light falling upon an elliptical reflector from one of the foci is redirected through the other focus. It should be noted that due to the convergence of the reflector side surfaces at the top of the reflector, light impinging upon any section in a vertical plane through one of the reflected rays indicated at Fig. 8, but on a higher or lower horizontal level, might be directed at a slightly different horizontal angle from that shown. Such divergence, however, is not necessarily large, so that for all practical purposes, vertical planes taken through the lines of reflected light shown at Fig. 8 might be said to include reflected light rays, or the horizontal projections of reflected light rays, from the intercepted vertical section of the reflector. It will, therefore, be evident that the lateral distribution from horizontal reflector sections above and below the plane of the light source is similar to that shown at Fig. 8.

Referring now to the vertical configuration of the main reflector 1, reference may be had to the various diagrams of Figs. 9 to 18, inclusive, and Fig. 7, taken in conjunction with Fig. 8. Fig. 7 is a cross-sectional view of the luminaire taken in the major plane of symmetry. Figs. 9 to 18, inclusive, show a number of significant vertical cross-sectional views taken perpendicular to the plane of the rim of the reflector and lying along the directions of reflected light from that point of the reflector where the section is taken. The vertical planes in which the sections of Figs. 9 to 18, inclusive, are taken are indicated by suitable legends at Fig. 8.

In general, the vertical cross sections of the side portions of the reflector in planes including light reflected from each such section are of generally parabolic configuration in a wide, lower zone, the parabolic axis being at approximately 53° to 56° to the vertical. The upper limits of the vertical parabolas are such that as much as possible of the reflected light is redirected across the luminaire in parallel rays and below the rim on the other side without intercepting the opposite side of the reflector. By utilizing a low, vertical angle of reflection of the order of 53° to 56°, it is possible to utilize almost the full height of the reflector side portions for parabolic redirection without intercepting the reflector rim on the opposite side. In a small upper zone of the reflector beyond the point where secondary reflection at the opposite side of the reflector is encountered, the reflector is elliptical in vertical cross section, thereby to converge reflected light and to direct it more sharply downward into the refractor. It will be understood, of course, that the reflected light redirected across the luminaire at relatively low vertical angles of 55° to 57° is raised by the prismatic refractor to vertical angles of 72° to 74½°, as it emanates from the body of the luminaire.

Furthermore, as will be evident from Figs. 9 to 18, the vertical angle of reflection, and hence the vertical angle at which light leaves the uniform lifting prisms, is lowest at the section A—A of Fig. 8 and increases in proceeding backward along the side portion to the section E—E. This effect raises the part of the main beam crossing the roadway to the remote side of the rectangular roadway pattern of Fig. 31.

By thus redirecting the main oblique beams from the reflector side portions across the luminaire housing at a relatively low vertical angle, and then raising the main beams by prismatic refraction as they leave the luminaire, it is possible to utilize the full vertical height of the reflector for parabolic or parallel reflection in vertical planes, thus obtaining a desirable high degree of light concentration in the main beams.

It will be understood that, while I refer to the vertical contours of Figs. 9 to 18 as being generally parabolic in a wide lower zone, the contour is not in all cases an exact geometric parabola due to the fact that the focus at the light center $c$ is not in the same vertical plane in which the section is taken. These sections are in fact sections of paraboloids, but the difference from true parabolic sections is slight, and my invention contemplates all such generally parabolic sections.

Figure 9:
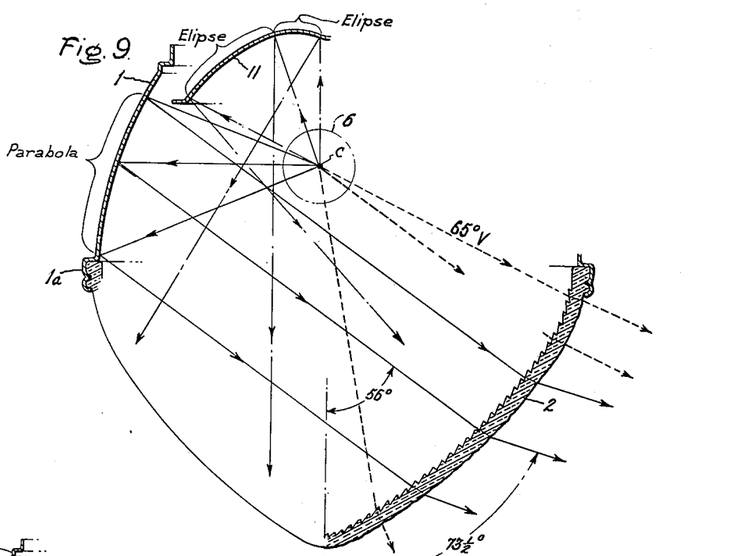
Figs. 9 to 18, inclusive, are partially schematic vertical cross-sectional views taken in significant vertical planes indicated at Fig. 8.

Referring now more particularly to Fig. 9, it will be observed that the side portion of the reflector 1 there shown is parabolic for substantially the entire height of the reflector, with its focus at the light center $c$ and its axis at an angle of 56° to the vertical from the nadir. This reflector section directs a wide beam of vertically parallel light across the luminaire and through the refractor on the opposite side below the reflector rim. As indicated at Figs. 8 and 9, this reflected light intercepts the refractor in an upper side area 20 forward of the minor axis. This refractor area 20 contains only horizontal prisms shaped to raise the incident light without any lateral redirection. The prismatic area 20 raises the incident light by about 17½°, so that the light emanating from the luminaire in the section shown at Fig. 9 is directed at a vertical angle of 73½°.

Figure 10:
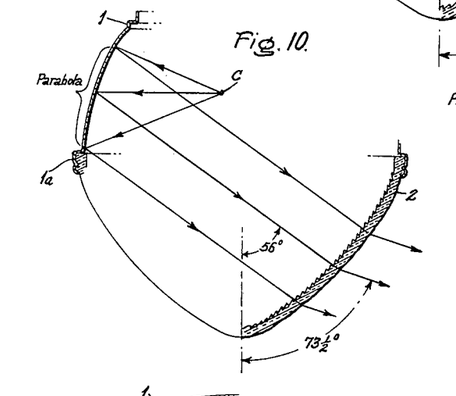
Figure 11:
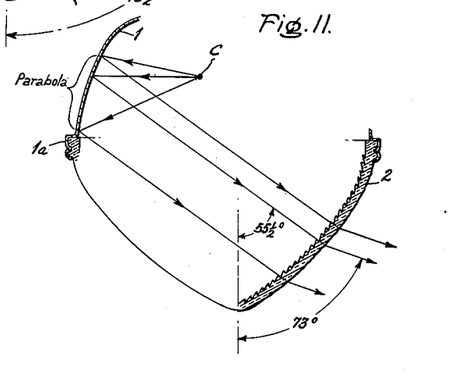

It will be evident from Figs. 10 and 11 that the vertical configurations along the lines CC and BB of Fig. 8, respectively, are generally similar to that of Fig. 9, which is taken along the line DD.

Figure 13:
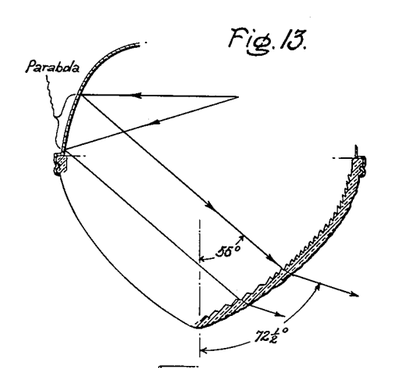
Figure 14:
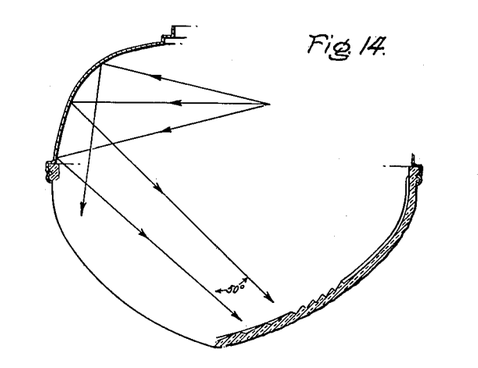
Figures 15, 16:
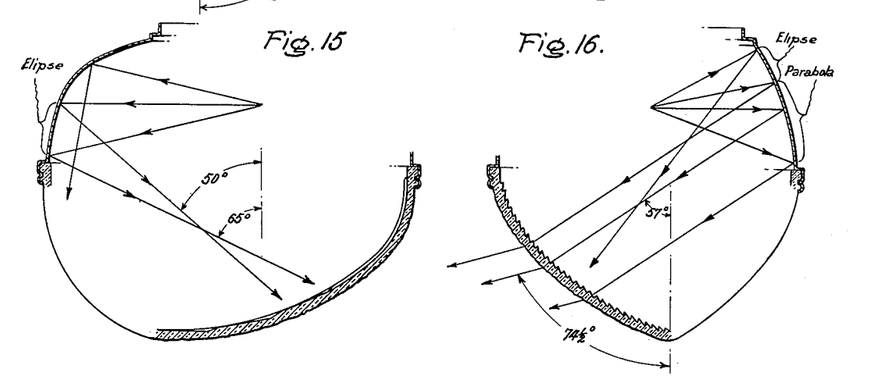
Figure 17:
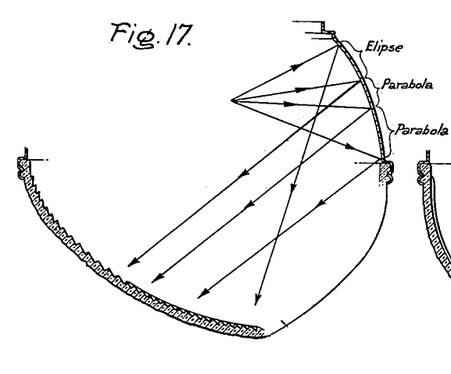
Figure 18:
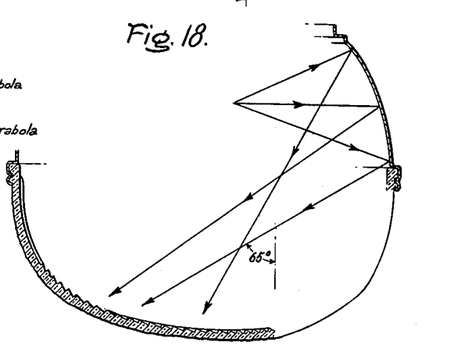
Figure 19:
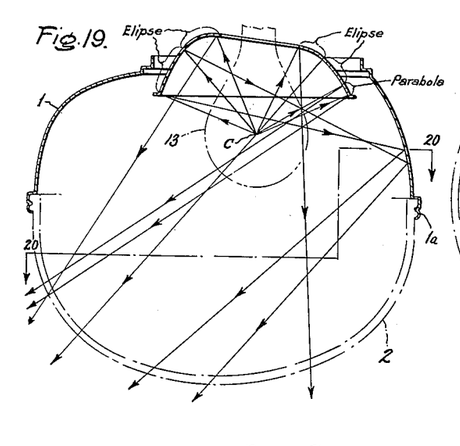
Fig. 19 is a partially schematic side elevational section similar to the view of Fig. 7 but for a luminaire including an upper auxiliary reflector for a filament light source, as shown at Fig. 6.

The vertical cross-sectional configuration of the front and rear end portions of the reflector 1 is illustrated in Figs. 13 to 18, inclusive. Figs. 13, 14 and 15 illustrate significant vertical contours of the front end sections, taken along the lines indicated at Fig. 8. Figs. 16, 17 and 18 are similar views for the rear end portion of the main reflector.

From Figs. 13 and 14, it will be observed that the lower zone of the reflector below the plane of the light source is approximately parabolic in vertical section. At this front end of the reflector, however, the deeply dished shape is limiting on the upward extent of the parabolic contour, rather than the limitation encountered for the side portions due to the reflector rim on opposite side of the luminaire. The front top portion of the luminaire is, of course, utilized to direct light downward and to the roadway in front of the luminaire. This downwardly directed light is raised and redirected somewhat by the prismatic refractor and spread out along the roadway. The operation of the refractor 2 in this connection will be more fully explained hereinafter. It will be observed that light from the vertical section of Fig. 13 impinges upon the refractor 2 in the area 20 and is raised by the horizontal prisms. Light from the vertical sections of Figs. 14 and 15 is directed into the rear quadrant of the refractor on the opposite side of the major axis (see Fig. 8) and encounters the oblique prisms previously referred to. At the extreme front end of the reflector 1, the lower zone of the reflector is elliptical in vertical section, as illustrated at Fig. 15, and light from this area of the reflector also is redirected by the oblique prisms in the rear quadrant of the refractor (see Fig. 8).

The vertical contour of the rear end portion of the reflector 1 is indicated by the sections of Figs. 16, 17 and 18. It will be observed from these figures that in a lower zone of appreciable width adjacent the rim, the main reflector is of parabolic contour, while in a relatively small upper zone, it is elliptical. In the extreme end section of Fig. 18, the lower zone of the reflector is elliptical with a remote conjugate focus and accordingly verges on the parabolic.

Turning now to the refractor bowl 2, the general outline of the bowl is best illustrated at Figs. 1, 2, 7 and 8. As illustrated at Fig. 8, the horizontal cross-sectional contour of the refractor is generally ovate, and similar to the horizontal contour of the main reflector 1. This is generally true of all the horizontal sections of the refractor from the rim to the bottom of the bowl. The side portions of the refractor, however, converge more sharply than do the side portions of the reflector. Preferably the refractor bowl 2 is as deep as possible in order to give a large source area of illumination, while still permitting a prism formation giving an appreciable lift angle, for example, about 17½° vertical lift. This is accomplished in the illustrated embodiment of the invention by making the transverse vertical outline of the refractor (Fig. 2) generally circular on each side between the rim and the plane of symmetry, with the center of each of the two converging circular arcs being approximately in the horizontal plane of the reflector mounting collar 1b and vertically above the reflector rim at the opposite side of the luminaire. The longitudinal vertical outline of the refractor in the plane of symmetry is generally elliptical, as shown at Fig. 1 and Fig. 7.

The refractor bowl 2 is symmetrical about the major vertical plane as shown at Fig. 2. In the illustrated embodiment of the invention, each side of the refractor is provided with a number of discrete prismatic areas best illustrated at Figs. 7 and 8. As previously mentioned, the area 20 is formed of horizontal prisms for vertical redirection of incident light. Each side of the refractor bowl is provided with an area 20 located at the upper side portion of each front quadrant of the refractor and extending approximately from the transverse axis through the light source up to the front end portion of the bowl. The horizontal prismatic areas extend from the rim of the bowl downward for approximately ¾ of the depth of the bowl.

The horizontal prisms in the areas 20, as previously mentioned, serve only to raise the incident light without effecting any lateral redirection. The area 20 receives both direct and reflected light. As best illustrated at Fig. 8, the reflected light which encounters the prismatic areas 20 from the main reflector 1 is principally that constituting the main oblique beams formed by the opposite side portions of the main reflector between the sections AA and EE. In general, most of the light rays constituting the main oblaque beams are nearly parallel in both horizontal and vertical projection, due to the paraboloidal horizontal and vertical contours of the principal side portions of the main reflector. In addition, of course, the main beams include also contributing components of diverging light emanating from the ends of the side portions of the reflector. This small amount of distributed light spreads the beam pattern properly and avoids a too spotty concentration of light. In addition to the light from the main beams, the prismatic lifting areas 20 receive also the greater portion of the reflected light from the rear end quadrants of the reflector 1 and transmit this light across the roadway without appreciable lateral redirection.

Each rear quadrant of the refractor bowl 2 is provided approximately midway of its depth with three adjacent and discrete areas of oblique prisms. The prisms in these areas are oblique to the plane of the refractor rim, and the slope of the prisms in each of the areas with respect to such plane increases from the front toward the rear of the refractor. These areas are identified as 21, 22 and 23, progressively from the front to the rear, as shown at Figs. 7 and 8. Along the upper or rim portion of the refractor 2 in the rear quadrants, the horizontal prismatic area 20 blends into an area 24 of arcuate upturned prisms which follow in general the contour of the discrete prismatic areas 21, 22 and 23. The area 24 receives principally direct light from the source. Thus, both rear quadrants of the refractor contain generally oblique prisms in the areas 21, 22, 23 and 24, all of which serve simultaneously to raise and laterally redirect incident light.

The rear refractor quadrants containing the various areas 21, 22, 23 of oblique prisms serve principally to raise and turn forward toward the main beams rearwardly directed light coming directly from the source. In addition, these rear quadrants also receive and redirect an appreciable amount of reflected light from the front end portions of the main reflector 1.

In the extreme front and rear end portions of the refractor there are provided areas 25 and 26, respectively, of substantially vertical prisms, which serve only to laterally redirect, or turn outward, the incident light. The light striking the areas 25 and 26 is principally direct light from the source and light from the upper reflector 11, as will be described hereinafter.

Finally, the lower portion of the refractor is provided with areas 27 of prisms disposed oblique to the major plane and converging forwardly and downwardly. The lower prismatic areas 27 (one on each side of the plane of symmetry) receive principally direct light from the source and a certain amount of reflected light from the upper auxiliary reflector 11. The prisms in the areas 27 operate to raise this direct and reflected light and turn it forward in the general direction of the main oblique roadway centerline beams. Thus, the downwardly directed light is raised to build up the main beam pattern and to avoid a bright spot beneath the luminaire.

Reference may now be had to the auxiliary upper reflector 11, as illustrated at Figs. 1, 5, 7 and 9 for an elongated horizontal light source such as an arc discharge lamp 6a. It will be evident from the diagrams that the principal purposes of this reflector are to redirect downwardly light which would otherwise be lost through the large top opening in the main reflector 1, and to redirect this light to the refractor at favorable angles and in such a way that it does not pass through either the inner bulb 6a or the outer bulb 6 of the discharge lamp.

In plan view outline, the auxiliary reflector 11 is generally circular and nearly equal in diameter to the diameter of the top opening in the main reflector. On each side of the major vertical plane of symmetry of the luminaire, the auxiliary upper reflector is provided with like shallow bowl-like embossed portions 11a and 11b, which merge into each other along the plane of symmetry. In longitudinal vertical section, the dished embossments 11a and 11b are generally elliptical in contour, as indicated at Fig. 7, and in horizontal contour they are generally ovate. Reflected light from the rear portions of the embossments 11a and 11b is directed downwardly and forwardll through conjugate foci slightly below and forward of the light center c. This reflected light from the rear portions of the auxiliary reflector 11 falls generally upon the lower front portion of the refractor 2 and is redirected upwardly and outwardly in the prismatic areas 20 and 25, respectively, to aid the main beam distribution.

Reflected light from the front portions of the embossments 11a and 11b is redirected rearwardly to the back end portion of the main reflector 1 and is there redirected by secondary reflection toward the bottom of the refractor 2.

Transversely of the luminaire, the reflected light from both the front and rear portions of the embossments 11a and 11b is fanned out elliptically to avoid the bulb 6 and to aid in part in building up the main oblique beams characteristic of the luminaire. This is accomplished by forming each of the embossments 11a and 11b in generally elliptical contour in transverse planes. This is illustrated generally at Fig. 9, taken in a vertical plane along the line D—D of Fig. 8.

It will be observed from Fig. 9 that the light reflected from the upper reflector is directed around the bulb 6, and that that from the extreme upper and side portions of the reflector 11 encounters the upper side portions of the refractor 2. Such light falling upon the front refractor quadrants is raised by the horizontal prisms and that falling on the rear refractor quadrants is raised and turned forward by the oblique prisms, so that much of the light reflected from the auxiliary reflector 11 is directed generally along the lines of the main oblique beams. Only a small portion of the light reflected from the auxiliary upper reflector 11 is directed vertically downward into the bottom portion of the refractor bowl.

At Fig. 7, I have illustrated by light dot and dash lines G, H, I and J the vertical projections of reflected light rays redirected from certain significant rear portions of the embossments 11a and 11b. While not specifically illustrated in the drawings, it will be readily understood that in transverse planes perpendicular to the plane of symmetry and including the lines G, H, I and J, the contour of the auxiliary upper reflector 11 is elliptical. These transverse elliptical sections have generally the same light distributing effect as that illustrated at Fig. 9.

Figure 27:
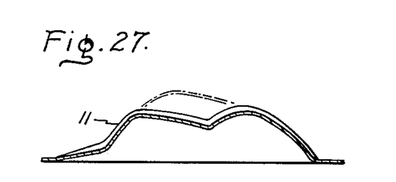
Fig. 27 is a cross-sectional view of an upper reflector for an elongated light source.

At Fig. 27, I have shown a cross-sectional view in the major plane of symmetry of a modified form of the upper reflector 11. The reflector 11 of Fig. 27 is the same in principle as that of Figs. 1, 5 and 7, but is reduced in height by offsetting downwardly about one-half of each of the ovate embossments 11a and 11b. This offset is indicated by the dotted line at Fig. 27 showing the shape of the reflector 11 of Fig. 7.

For use with a filament lamp, as illustrated at Fig. 4 and Figs. 19 to 23, inclusive, of the drawing, my luminaire is the same as that heretofore described in so far as the main reflector 1 and refractor 2 are concerned. For a filament lamp source, however, it is preferable to use an auxiliary upper reflector 12 of the type illustrated at Figs. 6 and 19 to 23, inclusive.

The incandescent type upper reflector 12 is generally of inverted dish formation and ovate in horizontal contour. This ovate dished reflector 12 is provided with an upper circular opening through which the lamp bulb 13 (Fig. 4) is adapted to pass, and is provided with a flared rim portion 12a of circular contour in order more effectively to shield the upper opening in the main reflector 1.

The principal purpose of the incandescent type auxiliary reflector 12 is similar to that of the previously described auxiliary reflector 11. The auxiliary reflector 12 has for its purpose redirection of upwardly directed light which would otherwise be lost through the top opening in the reflector 1, and the redirection of this light in such manner that it avoids as much as possible passing through the center $c$ of the light source 13. It is a further objective of the upper auxiliary reflector 12 to redirect a maximum amount of reflected light along the lines of the main asymmetric beams established by the main reflector 1. Generally, the foregoing purposes of the upper reflector 12 are accomplished by single reflection, the reflected light from the upper reflector 12 being directed below the rim of the main reflector 1. To an appreciable degree, however, reflected light from the upper reflector 12 is redirected forward by secondary reflection from the rear end of the main reflector 1.

Figure 20:
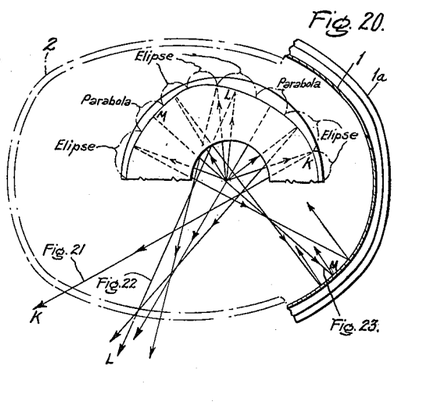
Fig. 20 is a partially schematic horizontal cross-sectional view, similar to the view of Fig. 8, taken along the line 20—20 of Fig. 19 and including a top view of the auxiliary reflector of Fig. 19.

The ovate horizontal contour of the auxiliary reflector 12, as illustrated at Fig. 20, is generally similar to the ovate horizontal contour of the main reflector 1, shown at Fig. 8. The auxiliary reflector 12 is symmetrical about the major vertical plane of symmetry of the luminaire, and its horizontal contour is made up of a plurality of adjacent elliptical and parabolic sections, as shown at Fig. 20. The various lines of reflected light shown at Fig. 20 illustrate that the rear side portions of the upper reflector 12 form auxiliary main beams directed generally along the lines of the main oblique beams from the main reflector 1. These auxiliary oblique beams are directed below the rim of the main reflector, and aid in building up the principal main beams. As further illustrated at Fig. 20, much of the light from the front end of the auxiliary reflector 12 is directed onto the rear end portion of the main reflector 1, and is then redirected by secondary reflection through the principal horizontal lifting prism area 20 of the refractor 2, in aid of the main oblique beams.

Figure 21:
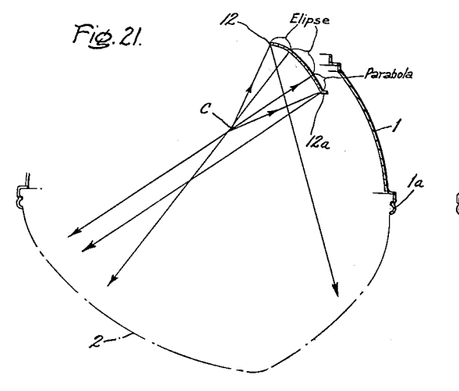
Figs. 21, 22 and 23 are partially schematic vertical cross-sectional views taken in significant planes indicated at Fig. 20.
Figure 22:
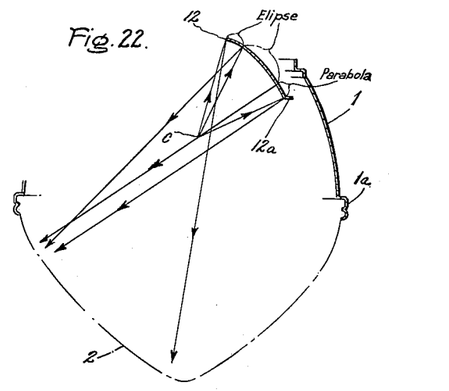
Figure 23:
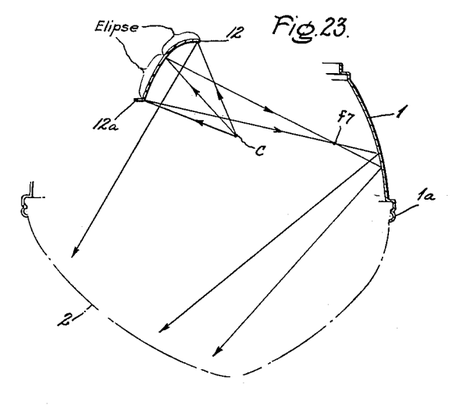

The vertical contour of the filament auxiliary upper reflector 12 is generally elliptical, with a narrow parabolic zone adjacent its rim, and is in this sense the converse of the main reflector 1. The significant vertical section of the upper reflector 12 are taken in vertical planes through the horizontal projection of reflected light from the section being considered. More specifically, the vertical sections through the upper reflector 12, taken along the reflected light lines KK, LL and MM at Fig. 20 are shown at Figs. 21, 22 and 23, respectively. It will be observed from Figs. 21 and 22 that the rearside portions of the auxiliary reflector 12 between the points K and L of Fig. 20 have a vertical contour made up of a lower zone of parabolic configuration and an upper zone of elliptical configuration. It is these rear side portions of the upper reflector 12 which forms the auxiliary oblique beams directed toward the refractor areas 20 and supporting the main oblique beams. As is evident from Figs. 21 and 22, the light from these rear side portions of the upper reflector 12 is directed into the refractor areas 20 below the rim of the main reflector 1 and forward of the light source. The extent of the lower parabolic zone of the vertical section of the upper reflector 12 is limited in part by the necessity for transmitting the reflected light to points below the rim of the main reflector, and in part, by the desirability for distributing some of the reflected light.

The vertical contour of the front portion of the auxiliary reflector 12 is principally elliptical, as illustrated at Fig. 23, the elliptical portions having one focus at the light center $c$ and a conjugate focus at $f_7$ within the main reflector 1 and above the plane of its rim 1a. By this arrangement, reflected light from the front end of the auxiliary reflector 12 impinges upon the rear end portion of the main reflector 1, as illustrated in Figs. 20 and 23, and is redirected obliquely downward and forward generally along the lines of the main oblique beams of the luminaire. Thus, this light from the forward end of the auxiliary reflector additionally builds up the main beams, which receive reflected light also from the rear side portions of the auxiliary reflector 12.

Figure 24:
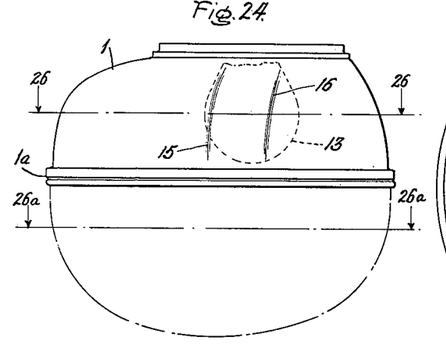
Figs. 24 and 25 are partially schematic side and top elevational views, respectively, of another luminaire embodying my invention and including a modified form of main reflector.
Figure 25:
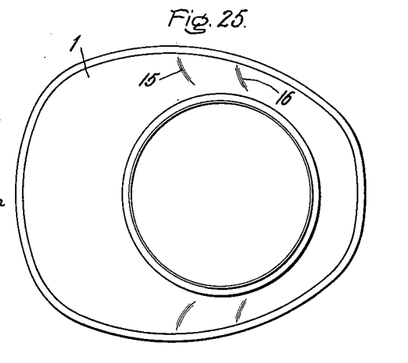
Figure 26:
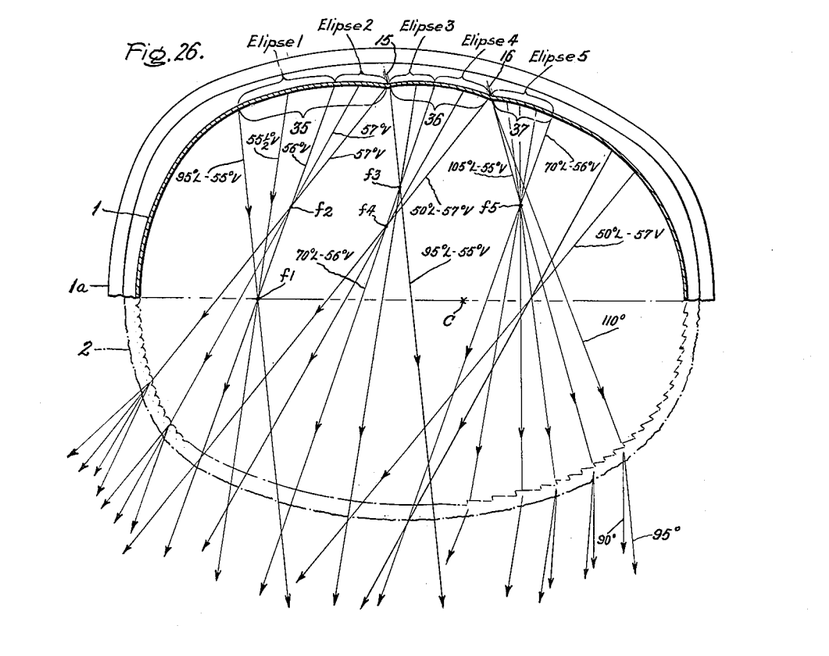
Fig. 26 is a horizontal sectional view of one-half of the luminaire shown at Figs. 24 and 25, taken along the line 26—26 of Fig. 24.

At Figs. 24 and 25, I have shown side and top views, respectively, of a modified form of my luminaire in which a pair of parallel spaced apart and vertically elongated indentations 15 and 16 are provided in the main side portions of the main reflector 1. A horizontal cross section of this modified main reflector, taken through the plane of the center of the light source, is shown at Fig. 26. The indented main reflector is useful primarily with a filament light source, with which the main reflector of Figs. 1 to 23 tends to concentrate the main beam more than may be desired.

The purpose of the indentations in the main reflector 1 as illustrated at Figs. 24 to 26, inclusive, is to divide the side portions of the main reflector 1 into three discrete areas 35, 36 and 37, each of which casts a distributed beam generally along the line of the main oblique reflector beam, and to widen the lateral angle of main beam coverage on the roadway. The three areas 35, 36 and 37 are each elliptical in horizontal section, as shown at Fig. 26; and the various ellipses, having a common focus at the light center, have secondary foci as indicated by the letters $f_1$–$f_5$, so located that distributed beams from the three areas overlap each other and define a large main beam source area on the refractor 2. As in Fig. 8 the side portions of the reflector of Fig. 26 receive a full quadrant of light flux from the source and form beams which intersect the roadway in a confined pattern covering a small angle of 45° as compared with the angle of 30° obtained with the reflector of Fig. 8. By referring to Fig. 26, it will be noted that each area 35, 36, and 37 changes the vertical angle of reflected light from 55° at the front to 57° at the rear thereof as does the area between A and E of Fig. 8 and that the indentations 15 and 16 occur where the horizontal angle of reflected light abruptly changes by 45° or more. The longitudinally spacing of the foci $f_1$–$f_5$ increases the apparent size and decreases the apparent brightness of the light source.

In vertical contour, the main reflector of Fig. 26 is very similar to that of Fig. 7 along the main side portions, that is, the vertical contour is parabolic for most of the reflector height. The end portions of the reflector of Fig. 26 are formed as previously described in connection with Figs. 7 to 18.

Figures 28, 29, 30, 31:
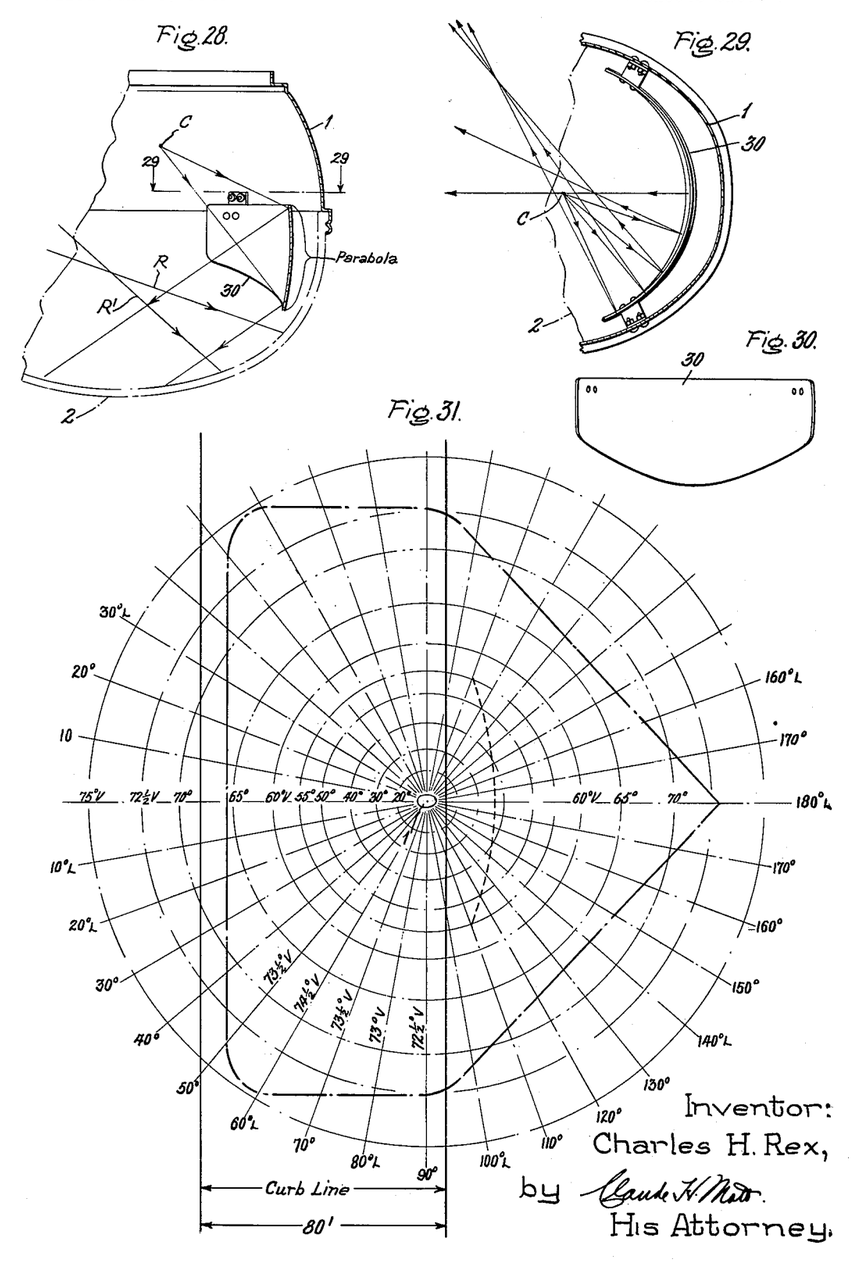
Figs. 28 and 29 are fragmentary side and top cross-sectional views, respectively, of a luminaire embodying my invention and including a rear depending auxiliary reflector or deflector.
Fig. 30 is a front elevational view of the deflector alone.
Fig. 31 is a light distribution diagram or roadway pattern typically obtained from a luminaire embodying my invention.

At Fig. 31, I have illustrated a typical pattern of illumination which is obtained from a luminaire embodying my invention, as above described. It will be noted from Fig. 31 that the pattern on the roadway itself is generally rectangular, with the luminaire positioned vertically above the roadway at approximately the mid-point of one side of the rectangle. In addition to this rectangular roadway pattern, the luminaire also provides a triangular pattern of illumination on the house side of the roadway. The radial and angular scale designations at Fig. 31 indicate where light rays leaving the luminaire at various vertical and lateral angles strike the roadway and roadside. For example, the radial line "60° L" designates a direction of light propagation 60° from a transverse line across the roadway, while the designation "74½° V" on this line indicates that light in this direction is raised to 74½° from the vertical to the nadir. Corresponding lateral designations are shown at Figs. 8 and 26, and various corresponding vertical designations are shown at Figs. 9 to 18 and others.

It may be desirable in certain applications to reduce the amount of the rearwardly directed house side illumination defined by the triangular roadside pattern of Fig. 31. For this purpose, I have illustrated at Figs. 28, 29 and 30 an auxiliary depending reflector, or deflector, adapted to be mounted below the main reflector 1 on the rear or house side thereof. Fig. 30 shows a front view of such a deflector 30, and Figs. 28 and 29, respectively, show a side cross-sectional view and top view of the deflector 30 mounted in the luminaire.

The depending reflector 30 serves to redirect light coming directly from the source c into the front side and bottom portions of the refractor 2, thereby to intensify the roadway pattern and to reduce the amount of illumination cast on the house side of the luminaire. The deflector 30 receives no reflected light from the main reflector 1 or from the upper auxiliary reflectors. Any reflected light from the front end of the main reflector 2 strikes the refractor 2 below the deflector 30, as indicated by the lines R and $R_1$ at Fig. 30.

In its horizontal contour illustrated at Fig. 29, the deflector 30 is generally elliptical and follows generally the shape of the rear end portion of the main reflector 1. In vertical contour, the deflector 30 is parabolic, as shown at Fig. 28, thereby to direct downwardly and forwardly a beam of light rays parallel in vertical projection. It will, of course, be understood that these beams of vertically parallel rays are fanned out, or diverging horizontally, due to the elliptical contour of the deflector.

The foregoing description of the light distribution by a luminaire embodying my invention has been based upon the assumption that the reflecting surfaces are specular in nature. It is possible, without disturbing greatly the general plan of light distribution, to etch the inner surfaces of the various reflectors lightly and thereby reduce the maximum candle power and provide some additional diffused light.

While I have described and illustrated various embodiments of my invention in which the main reflector and auxiliary reflectors are symmetrical on opposite sides of the major vertical plane, I wish to have it understood that without departing from the scope of my invention, the luminaire may, if desired, be so shaped that the main oblique beams directed along the roadway in opposite directions are at slightly different lateral angles with respect to the roadway center line.

Finally, it is desired to direct attention to the fact that, while I have described my refractor 2 as comprising a plurality of discrete areas of prismatic formation, it is possible, within the scope of my invention, to blend these areas into continuous prisms of entirely equivalent formation. For example, referring specifically to Fig. 7, the front quadrants of the refractor 2 above the level of the lower area 27 contains only horizontal prisms in the areas 20. The upper portions of the areas 20 blend smoothly into arcuate prisms in the area 24, while the lower prisms in the areas 20 are laterally adjacent a series of discrete areas 21, 22 and 23 containing oblique prisms of increasing angularity. It is evident that the oblique prismatic areas 21, 22 and 23 might be blended smoothly into each other and into the horizontal prismatic area 20 and vertical prismatic area 26 by smooth prismatic formation along arcuate lines substantially concentric with the prisms in the area 24. Such arcuately shaped prisms in the rear refractor quadrants would accomplish very much the same result as the discrete prismatic areas illustrated in the drawings.

Thus, while I have described only certain preferred embodiments of my invention by way of illustration, many modifications will occur to those skilled in the art and I, therefore, wish to have it understood that I intend in the appended claims to cover all such modifications as fall within the true spirit and scope of my invention.

What I claim as new and desire to secure by Letters Patent of the United States is:

1. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector having a horizontal sectional contour formed of component parts which direct a full quadrant of light flux from the effective center of said light source into an oblique beam directed across said vertical plane and converging to a roadway angle of from 30° to 45° and also having a vertical contour along sections of the reflected light which are generally parabolic for substantially the full height thereof with foci at the effective light center and axes downwardly sloping at angles from 53° to 57° to the vertical and increasing in angularity along said side portion from the front to the rear thereof, and the end portions of said reflector being elliptical in horizontal sectional contour and changing from a vertical sectional contour which is parabolic in its lower zone and elliptic in its upper zone adjacent said side portions of said reflector to a vertical sectional contour which is substantially elliptical at the ends of said reflector.

2. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion for a vertical angle of direct light cutoff of 65°, each side portion of said reflector having a horizontal sectional contour formed of component parts which direct a full quadrant of light flux from the effective center of said light source into oblique beams directed across said vertical plane and converging to a roadway angle of from 30° to 45° and also having a vertical contour along sections of the reflected light which are generally parabolic for substantially the full height thereof with foci at the effective light center and axes downwardly sloping at angles from 53° to 57° to the vertical and increasing in angularity along said side portion from the front to the rear thereof, and the end portions of said reflector being elliptical in horizontal sectional contour and changing from a vertical sectional contour which is parabolic in its lower zone and elliptic in its upper zone adjacent said side portions of said reflector to a vertical sectional contour which is substantially elliptical at the ends of said reflector.

3. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector having a horizontal sectional contour which is parabolic with foci at the effective center of the light source and axes which converge toward the front end of said reflector and also having a vertical contour along sections of the reflected light which are generally parabolic for substantially the full height thereof with foci at the effective light center and axes downwardly sloping at angles from 53° to 57° to the vertical and increasing in angularity along said side portion from the front to the rear thereof, and the end portions of said reflector being elliptical in horizontal sectional contour and changing from a vertical sectional contour which is parabolic in its lower zone and elliptic in its upper zone adjacent said side portions of said reflector to a vertical sectional contour which is substantially elliptical at the ends of said reflector.

4. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector having a horizontal sectional contour formed of component parts which direct a full quadrant of light flux from the effective center of said light source into oblique beams directed across said vertical plane and converging to a roadway angle of from 30° to 45° and also having a vertical contour along sections of the reflected light which are generally parabolic for substantially the full height thereof with foci at the effective light center and axes downwardly sloping at angles from 53° to 57° to the vertical and increasing along said side portion in angularity from the front to the rear thereof, the end portions of said reflector being elliptical in horizontal sectional contour and changing from a vertical sectional contour which is parabolic in its lower zone and elliptic in its upper zone adjacent said side portions of said reflector to a vertical sectional contour which is substantially elliptical at the ends of said reflector, and the top portion of said reflector being generally of elliptic contour in vertical and horizontal sections with a principal focus at the effective center of said light source and conjugate foci spaced from and about said light source, the rear part of said top portion directing light downward and forward of the effective center of the light source and the front part of said top portion directing light onto the rear end portion of said reflector.

5. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector having a horizontal sectional contour formed of component parts which direct a full quadrant of light flux from the effective center of said light source into oblique beams directed across said vertical plane and converging to a roadway angle of from 30° to 45° and also having a vertical contour along sections of the reflected light which are generally parabolic for substantially the full height thereof with foci at the effective light center and axes downwardly sloping at angles from 53° to 57° to the vertical and increasing along said side portion in angularity from the front to the rear thereof, the end portions of said reflector being elliptical in horizontal sectional contour and changing from a vertical sectional contour which is parabolic in its lower zone and elliptic in its upper zone adjacent said side portions of said reflector to a vertical sectional contour which is substantially elliptical at the ends of said reflector, and the top portion of said reflector being generally of elliptic contour in vertical and horizontal sections with a principal focus at the effective center of said light source and conjugate foci spaced from and about said light source, the rear part of said top portion directing light downward and forward of the effective center of the light source and the front part of said top portion directing light onto the rear end portion of said reflector, and a bowl-shaped refractor closing the mouth of said reflector and including a pair of oppositely disposed prismatic areas arranged principally to lift said oblique beams from the side portions of said reflector thereby to elongate the beam pattern on the roadway.

6. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector being indented along longitudinally spaced apart parallel lines generally perpendicular to the plane of said rim to provide a plurality of adjacent areas each of which has a vertical contour which along sections through the reflected light is generally parabolic for almost the full height of the reflector with foci at the effective light center and axes downwardly sloping at angles from 53° to 57° to the vertical and increasing along an area in angularity from the front to the rear thereof and each of which is elliptical in horizontal contour with a sharp change in the direction of light reflected from adjacent areas at each of said indentations and with all the elliptical surfaces of said areas of one side of said reflector having a common focus at the effective center of the light source and conjugate foci spaced lengthwise of the reflector to provide distributed beams of light which overlap one another and define a main light beam reflected from each side surface of said reflector.

7. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector being indented along longitudinally spaced apart parallel lines generally perpendicular to the plane of said rim to provide a plurality of adjacent areas each of which has a vertical contour which along sections through the reflected light is generally parabolic for almost the full height of the reflector with foci at the effective light center and axes downwardly sloping at angles from 53° to 57° to the vertical and increasing along an area in angularity from the front to the rear thereof and each of which is elliptical in horizontal contour with a sharp change in the direction of light reflected from adjacent areas at each of said indentations and with all the elliptical surfaces of said areas of one side of said reflector having a common focus at the effective center of the light source and conjugate foci spaced lengthwise of the reflector to provide distributed beams of light which overlap one another and define a main light beam reflected from each side surface of said reflector, and the end portions of said reflector being elliptical in horizontal sectional contour and changing from a vertical sectional contour which is parabolic in its lower portion and elliptic in its upper portion adjacent said side portions of said reflector to a vertical sectional contour which is substantially elliptical at the ends of said reflector.

8. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector being indented along longitudinally spaced apart parallel lines generally perpendicular to the plane of said rim to provide a plurality of adjacent areas each of which has a vertical contour which along sections through the reflected light is generally parabolic for almost the full height of the reflector with foci at the effective light center and axes downwardly sloping at angles from 53° to 57° to the vertical and increasing along an area in angularity from the front to the rear thereof and each of which is elliptical in horizontal contour with a sharp change in the direction of light reflected from adjacent areas at each of said indentations and with all the elliptical surfaces of said areas of one side of said reflector having a common focus at the effective center of the light source and conjugate foci spaced lengthwise of the reflector to provide distributed beams of light which overlap one another and define a main light beam reflected from each side surface of said reflector, and a bowl-shaped refractor closing the mouth of said reflector and including a pair of oppositely disposed prismatic areas arranged principally to lift said main light beams reflected from each side surface of said reflector thereby to elongate the beam pattern on the roadway.

9. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector being indented along longitudinally spaced apart parallel lines generally perpendicular to the plane of said rim to provide a plurality of adjacent areas each of which has a vertical contour which along sections through the reflected light is generally parabolic for almost the full height of the reflector with foci at the effective light center and axes downwardly sloping at angles from 53° to 57° to the vertical and increasing in angularity along an area from the front to the rear thereof and each of which is elliptical in horizontal contour with a sharp change in the direction of light reflected from adjacent areas at each of said indentations and with all the elliptical surfaces of said areas of one side of said reflector having a common focus at the effective center of the light source and conjugate foci spaced lengthwise of the reflector to provide distributed beams of light which overlap one another and define a main light beam reflected from each side surface of said reflector, and the end portions of said reflector being elliptical in horizontal sectional contour and changing from a vertical sectional contour which is parabolic in its lower portion and elliptic in its upper portion adjacent said side portions of said reflector to a vertical sectional contour which is substantially elliptical at the ends of said reflector, and a bowl-shaped refractor closing the mouth of said reflector and including a pair of oppositely disposed prismatic areas arranged principally to lift said main light beams reflected from each side surface of said reflector thereby to elongate the beam pattern on the roadway.

10. In a luminaire adapted to be positioned at one side of a roadway, an ovate reflector having like portions on opposite sides of a longitudinal plane which is vertical to a horizontal plane through the rim portion thereof, and means for mounting a light source with its effective center positioned eccentrically to the rear in said vertical plane and above said rim portion of said reflector and the light reflected from the side and end portions thereof through the mouth of said reflector, each side portion of said reflector being indented along longitudinally spaced apart parallel lines generally perpendicular to the plane of said rim to provide a plurality of adjacent areas each of which has a vertical contour which along sections through the reflected light is generally parabolic for almost the full height of the reflector with foci at the effective light center and axes downwardly sloping at angles from 53° to 57° to the vertical and increasing in angularity along an area from the front to the rear thereof and each of which is elliptical in horizontal contour with a sharp change in the direction of light reflected from adjacent areas at each of said indentations and wth all the elliptical surfaces of said areas of one side of said reflector having a common focus at the effective center of the light source and conjugate foci spaced lengthwise of the reflector to provide distributed beams of light which overlap one another and define a main light beam reflected from each side surface of said reflector, the top portion of said reflector being generally of elliptic contour in vertical and horizontal sections with a principal focus at the effective center of said light source and conjugate foci spaced from and about said light source, the rear part of said top portion directing light downward and forward of the effective center of the light source and the front part of said top portion directing light onto the rear end portion of said reflector, the end portions of said reflector being elliptical in horizontal sectional contour and changing from a vertical sectional contour which is parabolic in its lower portion and elliptic in its upper portion adjacent said side portions of said reflector to a vertical sectional contour which is substantially elliptical at the ends of said reflector, and a bowl-shaped refractor closing the mouth of said reflector and including a pair of oppositely disposed prismatic areas arranged principally to lift said main light beams reflected from each side surface of said reflector thereby to elongate the beam pattern on the roadway.

References Cited in the file of this patent

UNITED STATES PATENTS

| | | |
|---|---|---|
| 2,109,990 | Flaherty | Mar. 1, 1938 |
| 2,140,646 | Mitchell | Dec. 20, 1938 |
| 2,259,321 | Pahl | Oct. 14, 1941 |
| 2,275,560 | Saaf | Mar. 10, 1942 |
| 2,330,924 | Rolph | Oct. 5, 1943 |
| 2,474,326 | Rolph | June 18, 1949 |
| 2,474,327 | Rolph | June 28, 1949 |
| 2,486,558 | Franck | Nov. 1, 1949 |
| 2,493,087 | Rolph | Jan. 3, 1950 |

FOREIGN PATENTS

| | | |
|---|---|---|
| 68,666 | Norway | Dec. 11, 1944 |
| 448,645 | Great Britain | June 12, 1936 |
| 766,879 | France | Apr. 23, 1934 |